United States Patent [19]

Hayashi et al.

[11] Patent Number: 5,058,494
[45] Date of Patent: Oct. 22, 1991

[54] APPARATUS FOR PROCESSING BEAN CURD

[75] Inventors: Kojiro Hayashi; Yoshihito Kondo; Takahiro Miyawaki; Michihiro Mashiba, all of Tokushima, Japan

[73] Assignee: Shikoku Kakoki Co., Ltd., Tokushima, Japan

[21] Appl. No.: 626,241

[22] Filed: Dec. 12, 1990

Related U.S. Application Data

[63] Continuation of Ser. No. 328,387, Mar. 24, 1989, abandoned.

[30] Foreign Application Priority Data

Mar. 25, 1988 [JP] Japan ................................. 63-72868

[51] Int. Cl.⁵ ........................... A23C 3/02; A23J 1/00; A23L 1/20
[52] U.S. Cl. ........................................ 99/453; 99/459; 99/465; 99/483; 99/496
[58] Field of Search ................................. 99/353–356, 99/452, 453, 458, 459, 460, 465, 467, 473, 474, 477–479, 483, 495, 509, 510; 249/113; 425/84, 405 R

[56] References Cited

U.S. PATENT DOCUMENTS

| | | | |
|---|---|---|---|
| 1,405,016 | 1/1922 | Senke | 99/465 |
| 2,260,286 | 10/1941 | Allan | 99/478 |
| 2,846,767 | 8/1958 | Hengen et al. | 99/458 |
| 3,838,955 | 10/1974 | Dubbeld | 425/84 |
| 4,049,838 | 9/1977 | Krueger et al. | 99/458 |
| 4,509,413 | 4/1985 | Granberg et al. | 99/453 |
| 4,608,921 | 9/1986 | Mongiello, Sr. | 99/455 |
| 4,628,805 | 12/1986 | Derode | 99/460 |
| 4,750,415 | 6/1988 | Ostemar | 99/456 |
| 4,771,681 | 9/1988 | Nagata | 99/483 |
| 4,817,515 | 4/1989 | Bjerre et al. | 99/460 |

Primary Examiner—Timothy F. Simone
Attorney, Agent, or Firm—Armstrong, Nikaido, Marmelstein, Kubovcik & Murray

[57] ABSTRACT

A process for producing bean curd comprising the steps of cooling soybean milk and bittern individually to below the coagulating temperature of the milk, mixing the cooled milk and bittern together and filling the mixture into buckets, coagulating the mixture in the buckets by heating, and withdrawing the coagulated milk from the buckets and detwatering the coagulated milk to obtain formed bean curd. An apparatus for practicing the process comprises a mold box and a pressing closure each having in a required portion a multiplicity of holes not passing the coagulated milk therethrough but permitting the water contained in the coagulated milk to pass therethrough.

4 Claims, 2 Drawing Sheets

APPARATUS FOR PROCESSING BEAN CURD

This application is a continuation of application Ser. No. 328,387 filed Mar. 24, 1989, now abandoned.

BACKGROUND OF THE INVENTION

The present invention relates to a process and apparatus for producing bean curd of the type termed "momen tofu" which is bean curd conventionally prepared with use of "momen" or cotton cloth.

Conventionally, bean curd of the type mentioned is prepared by adding a coagulant to soybean milk at about 80° C. with stirring to coagulate the milk and by dewatering the coagulated milk for forming. The coagulant used is bittern, calcium sulfate, glucono delta lactone or the like.

The coagulated soybean milk is dewatered and formed by wrapping the coagulated milk with cotton cloth laid inside a mold box, placing a closure over the coagulated milk as wrapped with the cotton cloth and applying pressure to the closure with a heavy stone placed thereon.

The single mass of bean curd thus obtained corresponds to tens of unit blocks and is cut into blocks of unit size.

When bittern is used as the coagulant in the above process, there arises the problem that bean curd having good water retentivity can not be obtained since soybean milk rapidly coagulates at a high temperature. The problem as to water retentivity can be overcome if calcium sulfate or glucono delta lactone is used as the coagulant, whereas another problem is then encountered in that the bean curd prepared tastes somewhat sour, hence has an impaired flavor.

Furthermore, the conventional process essentially requires the use of cotton cloth, which involves the following problems. First, the cotton cloth is not sanitary. Second, it is difficult to automatically lay the cotton cloth inside the mold box and remove the cloth from the bean curd formed.

SUMMARY OF THE INVENTION

The main object of the present invention is to provide a process and apparatus for producing bean curd of the type stated free of the foregoing problems.

The process of the invention for producing bean curd comprises the steps of cooling soybean milk and bittern individually to below the coagulating temperature of the milk, mixing the cooled soybean milk and bittern together and filling the mixture into buckets, coagulating the mixture in the buckets by heating, and withdrawing the coagulated soybean milk from the buckets and dewatering the coagulated milk to obtain formed bean curd.

Preferably, the mixture is filled into each of the buckets in an amount required for preparing a block of bean curd. Subsequently, the blocks of soybean milk coagulated in the respective buckets are individually dewatered and thereby formed.

The coagulated soybean milk is dewatered and formed with use of a mold box and a pressing closure, each of which has in a required portion a multiplicity of holes not passing the coagulated milk therethrough but permitting the water contained in the coagulated milk to pass therethrough. For this step, the coagulated milk withdrawn from the bucket is placed into the mold box, the mold box is closed with the pressing closure, and pressure is applied to the closure for a required period of time.

The present invention further provides an apparatus for producing bean curd which comprises a mold box, and a pressing closure upwardly and downwardly movable into and out of the mold box, each of the mold box and the pressing closure having in a required portion a multiplicity of holes not passing therethrough the coagulated soybean milk placed in the mold box but permitting the water contained in the milk to pass therethrough.

With the above process, soybean milk and bittern are cooled to below the coagulating temperature, then mixed together and thereafter heated, so that the milk coagulates at a relatively moderate velocity. Accordingly, the process affords bean curd having good water retentivity despite the use of bittern.

The milk is coagulated and dewatered for forming in amounts each required for preparing one block of bean curd. This eliminates the need to cut the resulting bean curd into blocks. The cutting step can therefore be omitted from the bean curd production process, which in turn is simplified.

Because the water contained in the coagulated soybean milk is removed through the holes in the mold box and the pressing closure, there is no need to use cotton cloth, consequently obviating the sanitation problem due to the use of cotton cloth and the problem encountered in practicing the process automatically.

Bean curd can be prepared by the apparatus of the invention without using cotton cloth.

DESCRIPTION OF THE PREFERRED EMBODIMENT

An embodiment of the invention will be described below with reference to the drawings.

Figure 1:
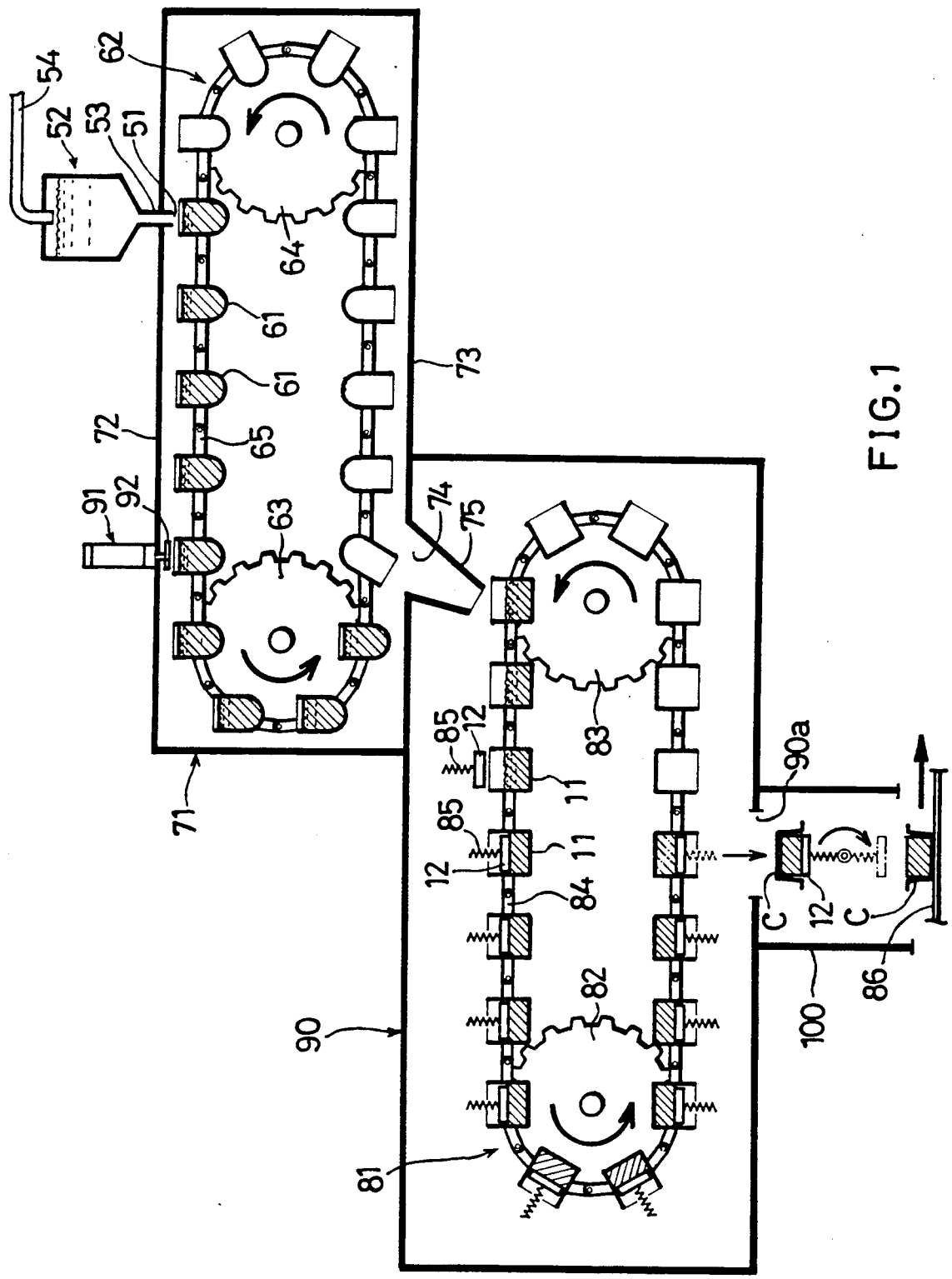
FIG. 1 is a diagram showing the overall construction of an apparatus embodying the invention.

FIG. 1 shows an apparatus for producing bean curd which comprises a filling device 52 having a downwardly directed delivery opening 51, an intermittently driven bucket conveyor 62 having buckets 61 so arranged as to stop one after another at a position immediately below the delivery opening 51, a steam chamber 71 enclosing the delivery opening 51 of the filling device 52 and the entire bucket conveyor 62, a forming conveyor 81 disposed outside the steam chamber 71, and an aseptic chamber 90 enclosing the entire forming conveyor 81.

The filling device 52 has a vertical nozzle 53 positioned close to the rear end of the top wall 72 of the steam chamber 71, extending through the top wall 72 and having the delivery opening 51 at its lower end. The mixture of soybean milk and bittern to be described in detail later is fed to the filling device 52 through a supply pipe 54.

The bucket conveyor 62 comprises a pair of front and rear vertical sprockets 63, 64, and an endless chain 65 reeved around the sprockets and having attached thereto the buckets 61 as arranged at a specified spacing. Each bucket 61 is pivotally movable about a horizontal line intersecting the chain 65 at right angles therewith.

The steam chamber 71 is in the form of a rectangular parallelepipidal box elongated longitudinally of the apparatus. The interior of the chamber 71 is maintained at a high temperature of about 98° C. A breaker 91 provided near the front end of the steam chamber top wall 72 is positioned immediately above the upper path of travel of the buckets. The breaker 91 has a breaking member 92 in the form of a lattice and vertically movable. The steam chamber 71 has a bottom wall 73 which is formed in a portion close to its front end with a communication opening 74 positioned immediately below the lower path of travel of the buckets 61. A slanting chute 75 has its upper end connected to the wall edge defining the opening 74.

The forming conveyor 81 comprises a pair of vertical front and rear sprockets 82, 83, an endless chain 84 reeved around the sprockets, and a multiplicity of mold boxes 11 equidistantly spaced apart and attached to the chain 84.

The rear sprocket 83 is disposed below the lower end of the chute 75. The front sprocket 82 is positioned to the front of the sprocket 83. The two sprockets 82, 83 are intermittently driven as timed with the bucket conveyor 62 such that the mold boxes 11 stop one after another at the position immediately below the lower end of the chute 75.

Each of the mold boxes 11 is provided with a pressing closure 12 supported by unillustrated means through a spring 85, etc. and movable with the mold box 11. The closure 12 is movable into and out of the mold box 11 and rotatable about a horizontal axis perpendicular to the direction in which the closure 12 moves with the box 11.

The aseptic chamber 90 in the form of a box like the steam chamber 71 communicates with the steam chamber 71 through the communication opening 74 and has a bottom wall formed with an outlet 90a. The outlet 90a is covered with the wall of an outside air blocking chamber 100.

Figure 2:
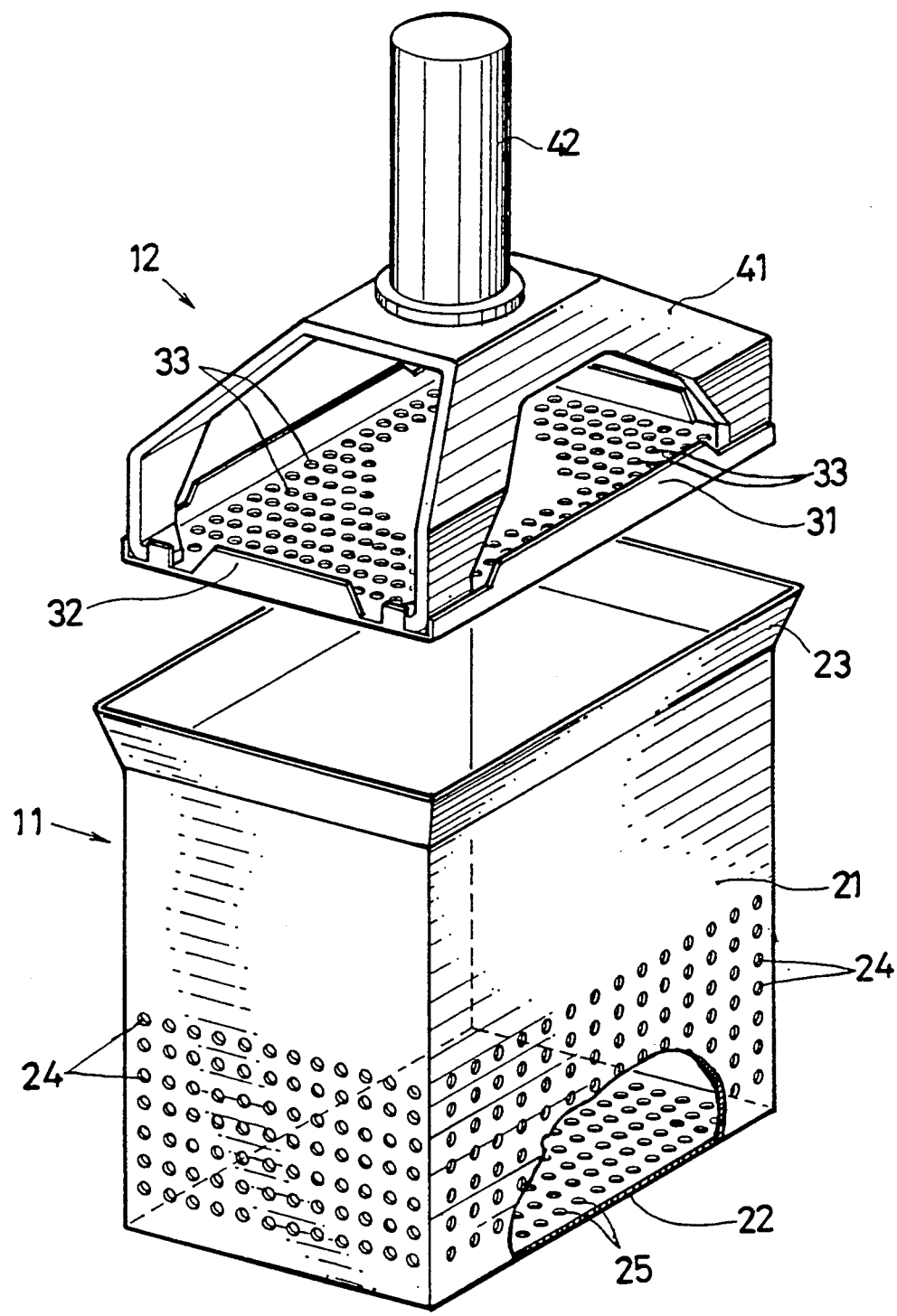
FIG. 2 is a perspective view of a mold box and a pressing closure.

Next, the mold box 11 and the pressing closure 12 will be described in detail with reference to FIG. 2.

The mold box 11 is in the form of a vertically elongated rectangular parallelepipedal box having an opening at its upper end and comprises a side wall 21 and a bottom wall 22. Each of the side wall 21 and the bottom wall 22 is made of stainless steel and has a thickness of 0.6 mm. The upper end of the side wall 21 defining the opening is provided with an upwardly flared portion 23. Approximately the lower half of the side wall 21 except for its corner portions has holes 24, 0.8 mm in diameter, at a pitch of 4 mm. The bottom wall 22 except for its peripheral portion is formed with holes 25, 0.8 mm in diameter, at a pitch of 2.5 mm.

The pressing closure 12 is in the form of a flat rectangular plate positionable inside the side wall 21 with a small clearance formed therebetween, made of stainless steel and having a thickness of 0.5 mm. The closure 12 is provided at its four side midportions with large and small recinforcing ribs 31, 32 which extend upward. The closure is formed generally over the entire area thereof with holes 33 of 0.8 mm in diameter as arranged at a pitch of 1.2 mm.

The pressing closure 12 has secured to its upper side a saddle-shaped holder 41 extending upward from its four corners. A vertical shank 42 is fixed to the top of the holder 41 and inserted in a socket of unillustrated lifting means.

The holes 24, 25, 33, if up to 0.5 mm in diameter, make the box and the closure difficult to clean and are liable to clog up, whereas if the diameter is not smaller than 1.0 mm, coagulated soybean milk will leak through the holes. To be suitable, the diameter is 0.6 to 0.9 mm.

The pitch of the holes 24 in the side wall 21 of the mold box 11 is larger than the pitch of the holes 25 in the bottom wall 22 of the box 11. If the former pitch is approximately equal to the latter pitch, the side portion of the formed block of bean curd becomes rough-surfaced because when the coagulated soybean milk in the mold mox 11 is gradually diminished in volume, the portion of the milk forming the side surface of the bean curd is rubbed by the inner surface of the side wall 21 and defaced by the irregularities in the wall inner suface to due the presence of holes.

Aseptic bean curd is produced by the following process. A mixture of soybean milk and bittern is fed to the filling device 52. The bittern is magnesium chloride having a purity of at least 99.5%. The mixture is prepared by sterilizing soybean milk and bittern by heating, cooling the milk by a heat exchanger to such a temperature that becomes about 15° C. when the milk is to be filled into the bucket, cooling the bittern to about 20° C. by like means and thereafter mixing the milk and bittern together by an unillustrated mixer.

The delivery opening 51 of the filling device 52 is provided with a damper (not shown) for closing the opening. The mixture is filling into each bucket 61 in an amount corresponding to one block of bean curd by opening the damper. For example, when one block of bean curd to be formed has a volume of 400 c.c., it is suitable that the amount of the mixture be about 750 c.c.

While the bucket 61 filled with the mixture travels to above the communication opening 74 in the chamber 71, the mixture coagulates. This requires about 30 minutes.

About 2 minutes before the bucket 61 reaches the position above the opening 74, the bucket 61 comes to a position immediately below the breaker 91, which operates to break the soybean milk immediately before coagulation to lumps about 20 mm cube in size.

When the bucket 61 is brought to the position above the communication opening 74, the bucket 61 which has been in an erect position is turned upside down by unillustrated means, whereby the milk coagulated in the bucket 61 is discharged from the chamber 71 through the chute 75.

The coagulated milk falling through the chute 75 is received by the mold box waiting below the chute, whereupon the pressing closure 12 advances into the mold box 11. Pressure is applied to the pressing closure 12 while the closure 12 travels with the mold mox 11, whereby the coagulated milk is dewatered and formed to obtain bean curd. The pressure to be applied to the closure 12 in this step is progressively increased stepwise with time.

When the mold box 11 advances into the lower path of its travel, the mold box 11 is turned upside down. By the time the box 11 in this position reaches the midportion of the path, the bean curd is completely dewatered and formed. The pressing closure 12 then descends to retract from inside the mold box 11, and the bean curd as placed on the closure 12 is withdrawn from the mold box 11. The closure 12 in this state continues to descend, whereby the bean curd is discharged from the aseptic chamber 90 through the outlet 90a and the air blocking chamber 100. By unillustrated means, the pressing closure 12 is returned to the initial position where it advanced into the mold box 11.

A container C in an inverted state is placed over the withdrawn bean curd by an unillustrated capping device. The container C with the bean curd placed therein is then brought to an erect position by turning the closure 12 through 180 degrees and is delivered onto a discharge conveyor 86.

An unillustrated lid is placed over the bean curd containing container C, which is thereafter cooled to about 100° C., whereby a finished product is obtained.

What is claimed is:

1. An apparatus for producing bean curd, by coagulating a mixture of soybean milk and bittern producing coagulated soy bean milk, comprising:
    an intermittently driven bucket conveyor having buckets stoppable one after another at a filling station;
    a filling device having a delivery opening directed downward to oppose each of the buckets from above when the bucket is at rest at the filling station,
    a steam chamber enclosing at least the delivery opening of the filling device and the entire bucket conveyor,
    a forming conveyor disposed outside the steam chamber and having a multiplicity of mold boxes movable along a predetermined path and pressing closures each movable with the mold box, the mold boxes and the pressing closures each having in a required portion a multiplicity of holes for selectively removing water contained in the coagulated soybean milk but preventing the passage of the coagulated soybean milk, and
    means for transferring coagulated soybean milk from the bucket conveyor to the forming conveyor.

2. An apparatus as defined in claim 1 wherein the holes are 0.6 to 0.9 mm in diameter.

3. An apparatus as defined in claim 1 wherein the path of travel of the buckets is provided with a breaker downstream from the filling station for breaking the soybean milk coagulated in the buckets.

4. An apparatus as defined in claim 1 further comprising a closed aseptic chamber in communication with the steam chamber and enclosing the forming conveyor.

* * * * *